(12) United States Patent
Fischhaber

(10) Patent No.: US 10,106,181 B1
(45) Date of Patent: Oct. 23, 2018

(54) TACK CART

(71) Applicant: Conrad Fischhaber, Bay City, MI (US)

(72) Inventor: Conrad Fischhaber, Bay City, MI (US)

( * ) Notice: Subject to any disclaimer, the term of this patent is extended or adjusted under 35 U.S.C. 154(b) by 0 days.

(21) Appl. No.: 15/631,570

(22) Filed: Jun. 23, 2017

(51) Int. Cl.
| | | |
|---|---|---|
| *B62B 1/12* | (2006.01) | |
| *B62B 1/20* | (2006.01) | |
| *B68B 99/00* | (2006.01) | |
| *B62B 1/00* | (2006.01) | |

(52) U.S. Cl.
CPC ........... *B62B 1/208* (2013.01); *B62B 1/202* (2013.01); *B68B 99/00* (2013.01); *B62B 1/008* (2013.01); *B62B 2205/02* (2013.01); *B62B 2501/02* (2013.01); *B62B 2501/065* (2013.01)

(58) Field of Classification Search
CPC .... B62B 1/04; B62B 1/06; B62B 1/12; B62B 1/14; B62B 1/22; B62B 1/26; B62B 3/04; B62B 3/10; B62B 3/1472
USPC ...... 280/652, 47.34, 47.35, 79.3, 47.19, 651
See application file for complete search history.

(56) References Cited

U.S. PATENT DOCUMENTS

| | | | | |
|---|---|---|---|---|
| 3,147,606 A | * | 9/1964 | Holmberg | A47B 81/007 |
| | | | | 108/129 |
| 3,305,101 A | * | 2/1967 | Mills | B68C 1/002 |
| | | | | 211/106.01 |
| 3,688,912 A | * | 9/1972 | Wilmoth | A47F 5/08 |
| | | | | 211/85.11 |
| 3,780,971 A | * | 12/1973 | De Filipps | B68C 1/002 |
| | | | | 211/104 |
| 3,897,924 A | * | 8/1975 | Cook | B62B 1/14 |
| | | | | 108/118 |
| 3,930,663 A | * | 1/1976 | Scripter | B62B 1/042 |
| | | | | 280/47.33 |
| D255,611 S | * | 6/1980 | Love | D30/143 |
| 4,356,922 A | * | 11/1982 | Dierksheide | B68C 1/002 |
| | | | | 211/104 |
| 4,432,459 A | * | 2/1984 | Coldren | B68C 1/002 |
| | | | | 206/557 |
| 4,549,748 A | * | 10/1985 | Haley, Sr. | B62B 3/02 |
| | | | | 248/98 |
| 4,793,628 A | * | 12/1988 | Haley, Sr. | B62B 3/02 |
| | | | | 248/98 |
| 4,964,650 A | * | 10/1990 | Dickinson | B62B 3/02 |
| | | | | 280/47.34 |
| D316,919 S | * | 5/1991 | Reep | D30/143 |
| 5,050,744 A | * | 9/1991 | Floyd | B68C 1/002 |
| | | | | 211/85.11 |
| D321,773 S | * | 11/1991 | Chiang | 280/47.34 |
| 5,165,553 A | * | 11/1992 | Benson | B25H 1/06 |
| | | | | 211/175 |
| 5,251,925 A | * | 10/1993 | Haley, Sr. | B62B 3/106 |
| | | | | 248/98 |
| 5,259,521 A | * | 11/1993 | Shaffer | B68B 9/00 |
| | | | | 211/199 |
| 5,338,049 A | * | 8/1994 | Goring | B62B 1/18 |
| | | | | 280/47.19 |
| 5,339,610 A | * | 8/1994 | Mondry | B68C 1/002 |
| | | | | 54/1 |
| 5,362,078 A | * | 11/1994 | Paton | B62B 1/12 |
| | | | | 280/35 |

(Continued)

*Primary Examiner* — Jeffrey J Restifo

(57) ABSTRACT

A collapsible, mobile, tack cart capable of storing a saddle, saddle pads, cinches, bedding bail, boots, blankets, buckets, shampoo, brushes, hoof picks and the like.

14 Claims, 5 Drawing Sheets

(56) References Cited

U.S. PATENT DOCUMENTS

| | | | | |
|---|---|---|---|---|
| 5,474,312 A * | 12/1995 | Starita | ............ | B62B 3/10 |
| | | | | 280/47.19 |
| D377,548 S * | 1/1997 | O'Shea | ............ | D30/143 |
| 5,590,795 A * | 1/1997 | Wright | ............ | A47B 81/00 |
| | | | | 211/104 |
| 5,615,783 A * | 4/1997 | Warnken | ............ | B68C 1/002 |
| | | | | 211/104 |
| 5,791,668 A * | 8/1998 | Lenardson | ............ | B62B 1/208 |
| | | | | 280/47.19 |
| 6,443,481 B1 * | 9/2002 | Stravitz | ............ | A47B 31/04 |
| | | | | 211/201 |
| 6,616,152 B2 * | 9/2003 | Oliver | ............ | B62B 1/12 |
| | | | | 280/35 |
| 6,659,476 B2 * | 12/2003 | Weida | ............ | B62B 1/26 |
| | | | | 211/85.11 |
| 6,929,269 B2 * | 8/2005 | Oliver | ............ | B62B 1/12 |
| | | | | 280/35 |
| 7,377,538 B2 * | 5/2008 | Stuart | ............ | B62B 3/027 |
| | | | | 280/651 |
| 7,628,406 B1 * | 12/2009 | Thomas | ............ | B62B 1/14 |
| | | | | 280/47.18 |
| 7,905,502 B2 * | 3/2011 | Oliver | ............ | B25H 3/00 |
| | | | | 280/35 |
| 7,942,277 B1 * | 5/2011 | Flynn | ............ | B68C 1/002 |
| | | | | 211/1.53 |
| 8,226,092 B2 * | 7/2012 | Oliver | ............ | B25H 3/00 |
| | | | | 280/35 |
| 8,523,197 B2 * | 9/2013 | Baatz | ............ | A47B 31/04 |
| | | | | 280/42 |
| 8,616,383 B1 * | 12/2013 | Miller | ............ | B68C 1/002 |
| | | | | 211/1.51 |
| 9,493,336 B2 * | 11/2016 | Scanlon | ............ | B68C 1/002 |

* cited by examiner

TACK CART

BACKGROUND OF THE INVENTION

The inventor herein is aware of three publications dealing with tack carts. U.S. Pat. No. 6,659,476, issued Dec. 9, 2003 to Weida, deals with a horse tack cart for transporting and storing tack. The cart includes a conveying member and a storage member mounted thereto. The cart has components that allow for the dismantling of the cart, but it is not collapsible.

U.S. Pat. No. 7,628,406 that issued Dec. 8, 2009 to Thomas, et al deals with a hand truck to transport horse related equipment. The hand truck is similar to the device of Weida in that it has removal or dismountable components. However, the construction of the cart is complex, and it is not collapsible.

U.S. Pat. No. 9,493,336 that issued Nov. 15, 2016 to Scanlon et al deals with a portable saddle stand apparatus. The device does not have wheels nor is it collapsible.

THE INVENTION

Thus, what is disclosed and claimed herein is a collapsible, mobile, tack cart. The tack cart comprises a welded frame, wherein the welded frame is comprised of a first side frame and an opposing second side frame, wherein the frames have a top, a bottom, a near end and a distal end.

The side frames are stabilized by a collapsible support table located near the bottom of the cart. The side frames each have a free-wheeling, rotatable wheel attached to each side frame, near the bottom and near the distal end.

There is a rounded frame surmounting the top of the side frames, the rounded frame having a first bottom edge and a second bottom edge. The rounded frame is hingedly secured to one side frame at the top of the side frame at the first bottom edge. The rounded frame is nested on the second side frame by a single rail.

There are lift handles fixedly attached to each of the side frames at the back and near the top. There is a removable support rod attached to the top of the tack cart to support saddle pads and the removable support rod has a front end hook configuration. There is at least one hook attached to the near end of the rounded frame.

DETAILED DESCRIPTION OF THE INVENTION

Figure 1:
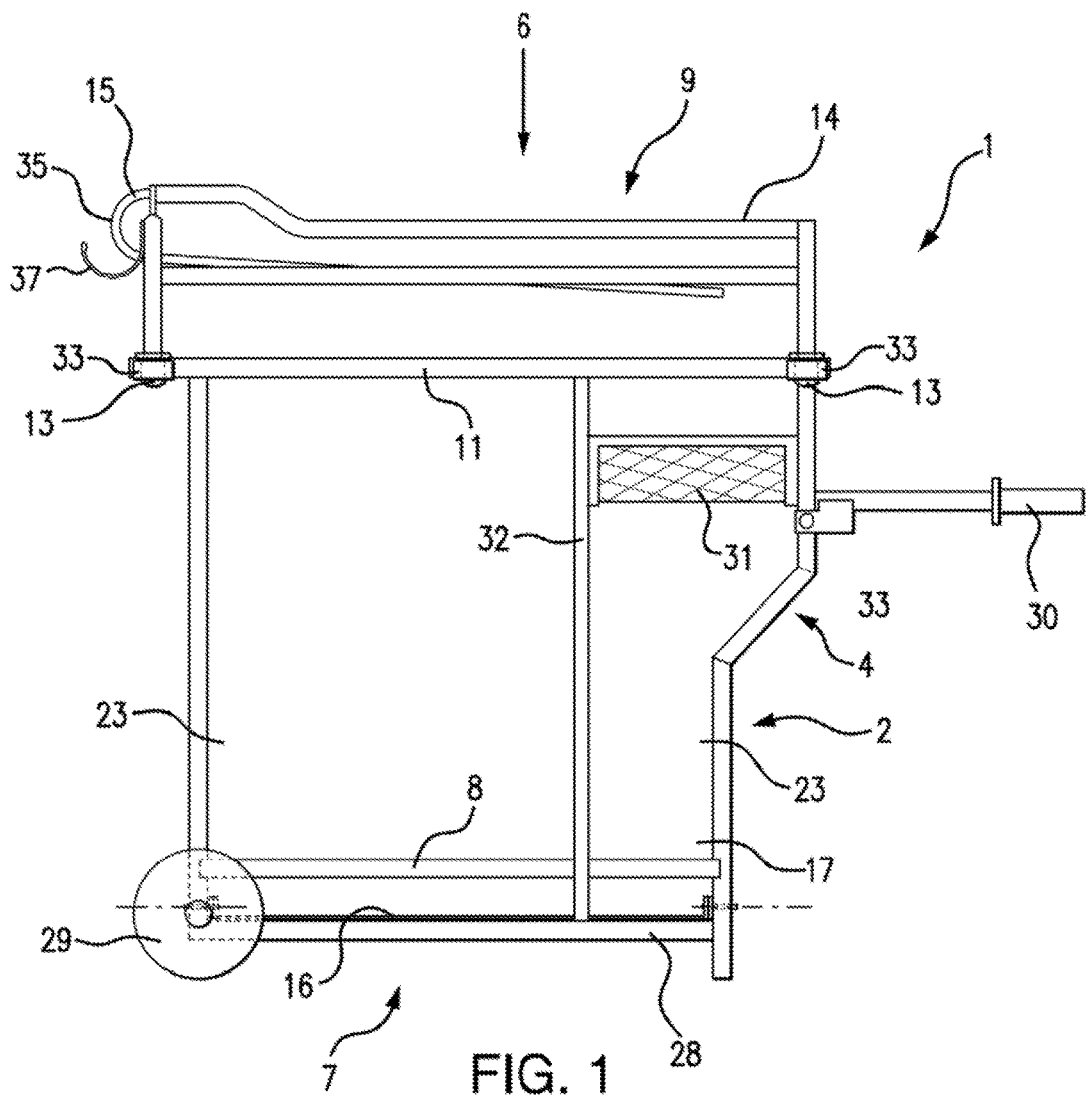
FIG. 1 is a full side view of a device of this invention.

Turning now to FIG. 1, wherein there is shown a full side view of a cart 1 of this invention that is mobile, collapsible and inexpensive.

Figure 2:
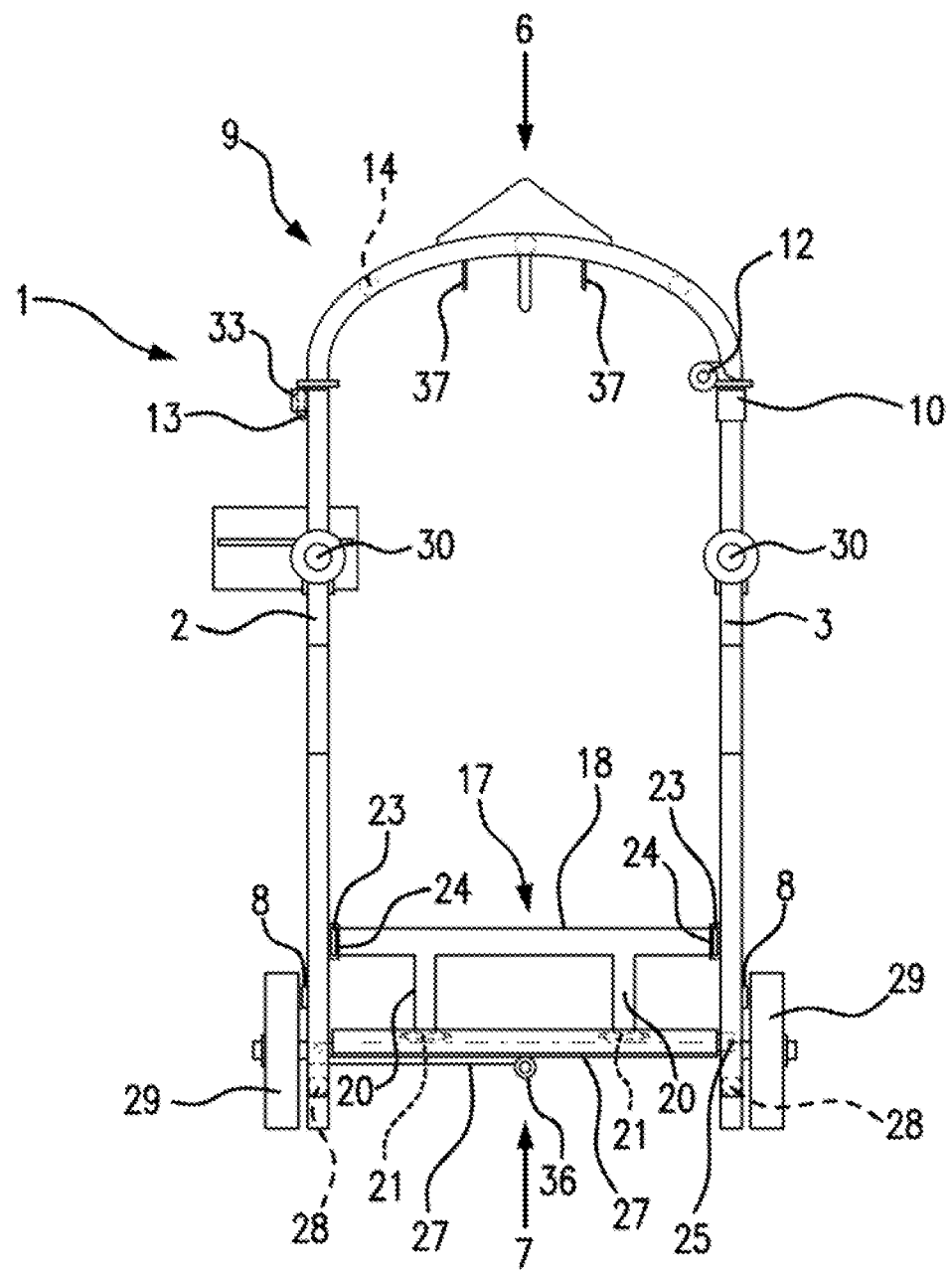
FIG. 2 is a full back end view of the device of FIG. 1.

FIG. 1 shows a collapsible cart 1 of this invention which has a near end 4 and a distal end 5, wherein there is also shown two side frames 2 and 3 (see FIG. 2), a top 6 and a bottom 7. The frames 2 and 3 are supported by side support struts 8 running from the near end 4 to the distal end 5. There is a rounded top 9 surmounting the side frames 2 and 3, and the rounded top has a first side edge 10 (FIG. 2) and a second side edge 11.

The first side edge 10 of the rounded top 9 is hingedly mounted on the top 6 of the side frame 3 with hinges 12 (FIG. 2) and the second side edge 11 nests on the top 6 of the frame 2. The rounded top 9 has a set of hooks 13, one on the near end and one on the distal end and these hooks insert into openings 33 attached to the outside of the frames 2 and 3 such that the hooks 13 can insert into them when the tack cart 1 is fully open and erect.

Figure 3:
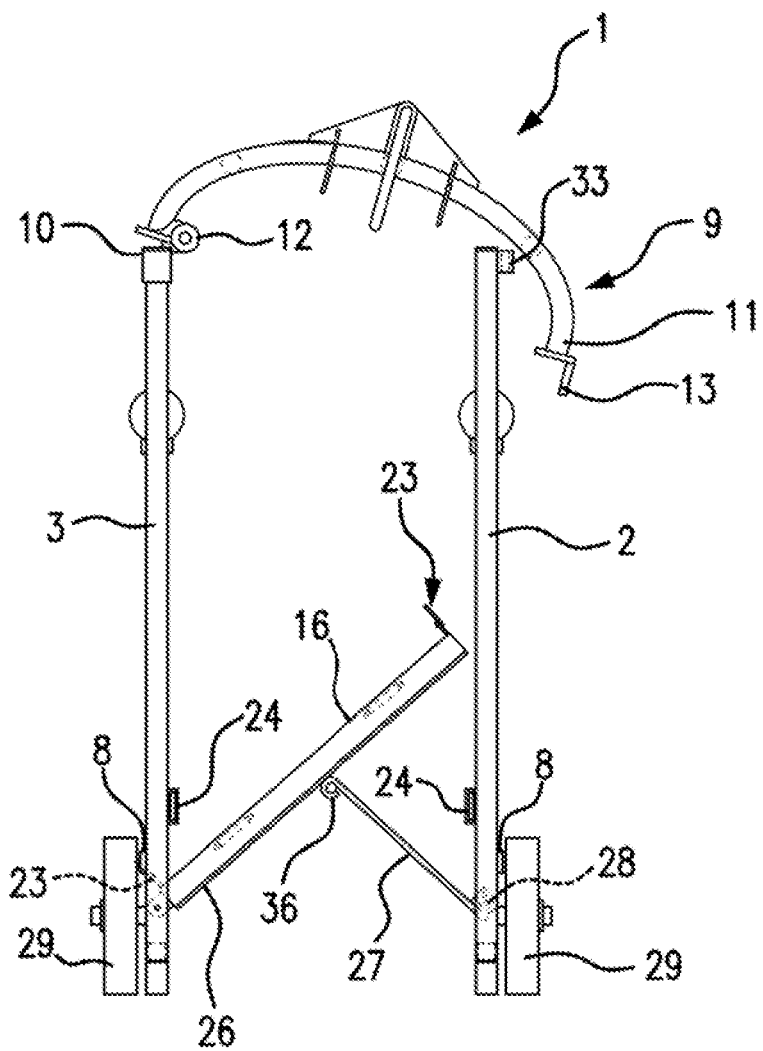
FIG. 3 is a full back end view of the device of FIG. 2 showing the rounded frame unattached from the side frame.
Figure 4:
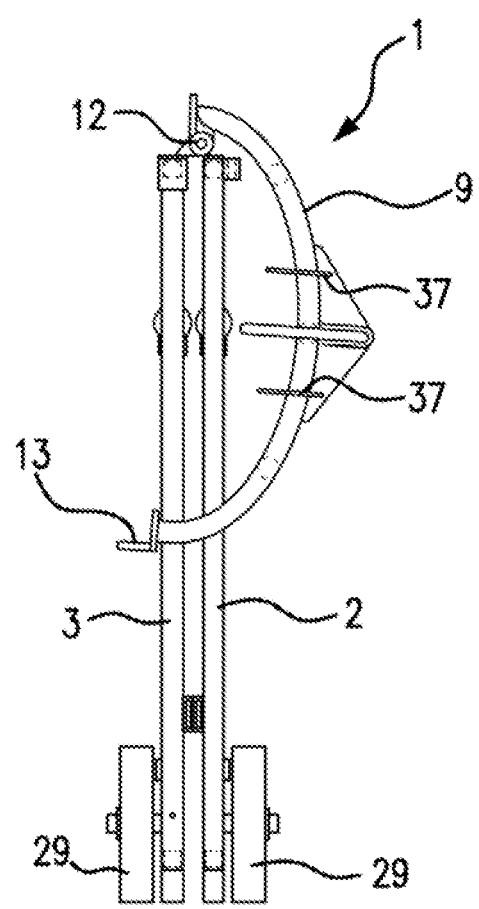
FIG. 4 is a full end view of the device of FIG. 1 in a collapsed condition.
Figure 5:
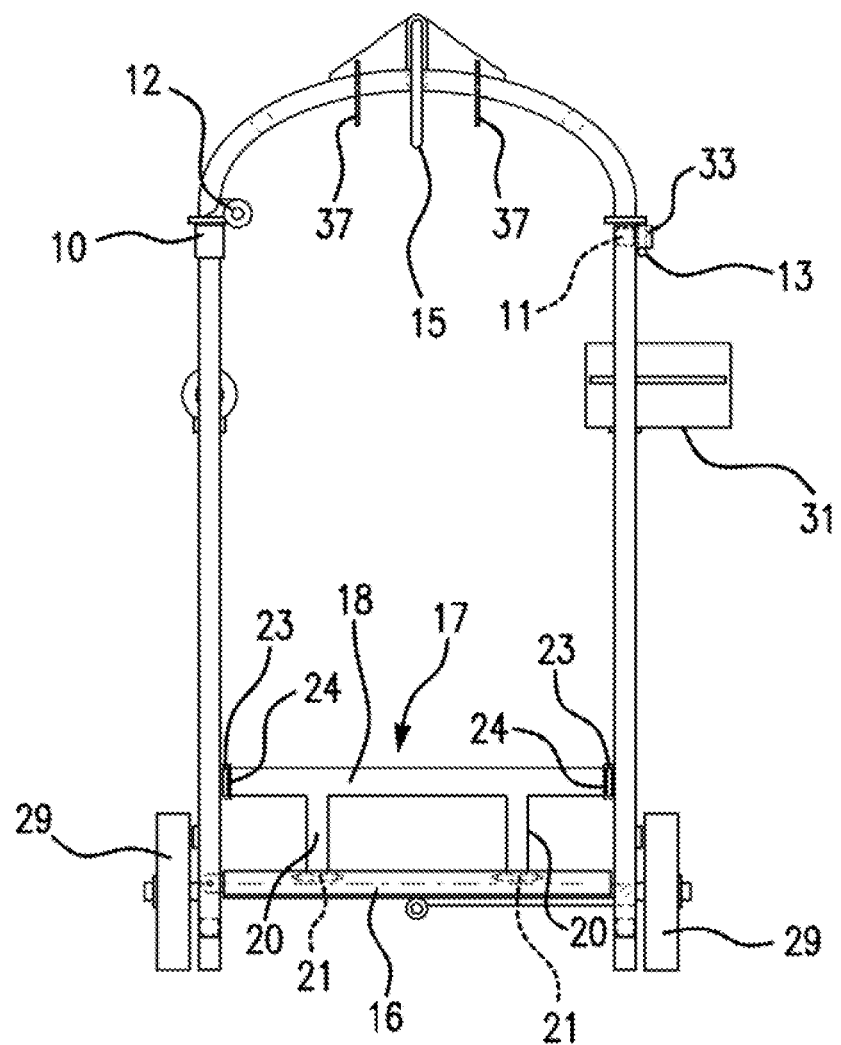
FIG. 5 is a full back end view of the device of FIG. 1 showing the attachment of a container.

The cart 1 is stabilized by the use of stiffening rails 17, and it should be noted that the stiffening rails 17 are comprised of a top rail 18, (FIG. 5). It is further comprised of at least two upright struts 20 which are hinged with hinges 21 shown in FIG. 5. The top rail 18 has at each end a rotatable rod 23 (shown in FIG. 3), which is insertable in receivers 24 attached to each side frame 2 and 4. The rotatable rods 23 are inserted in the receivers 24 and then rotated either up or down to lock the stiffening rails 17 into place. There is a stiffening rail 17 at each end of the cart 1.

Mounted as part of the rounded top 9, as a single tube is a bar 14 for hanging saddle blankets. Insertable into the single tube 14 is a long rod 15 that bent such that it parallels the single tube 14, but is some predetermined distance from the single tube 14. The rod 15 is bent 35 at the near end to provide a handle. The rod 15 allows for the hanging of additional gear such as halters, bridles, reins and the like.

The cart 1 has a table 16, which is mounted on the interior of the cart 1 and at the bottom 7. The table 16 is configured such that it is rotatable around hinges 25 that allow the table 16 to press up against the frame 3 when the cart 1 is collapsed for storage.

The table is partially supported by support members 26, which are configured such that the portion 26 that is hingedly attached to the frame 3 is fixedly attached to the bottom of the table 16, while the remaining portion 27 is not fixedly attached to the table 16, but is hingedly attached by hinge 28 to the frame side wall 2 at the bottom end. The support members are hinged by hinge 36.

When the cart 1 is collapsed, for example, for storage or transfer, the stiffening rails 17 at each end is loosened from the attachment to the side frames 2 and 3, and laid upon the top surface of the table 16. Thereafter, the rounded top 9 is lifted from its nesting position on frame 2, and the table 16 is raised and pushed into the frame 3 whereupon the frame 2 will press up against the frame 3 and the table.

For purposes of convenience, there is at least one hook 37 mounted on the rounded top 9 at the near end, a set of wheels 29 attached to the distal end and at the bottom of the side frames 2 and 3, and a set of handles 30 mounted on the near end 4 of the cart 1.

In addition, there is a removable container 31 (FIG. 5) mounted on one of the side frames which requires a separate rail 32 (FIG. 1) for support. The container is contemplated within this invention to be approximately 6 by 10 inches and about 4 to 8 inches high.

The cart 1 of this invention in overall dimensions can be approximately 38 to 60 inches high, about 24 to 36 inches long, and about 10 to 20 inches wide.

The cart 1 and all of its components are essentially manufactured from metal, plastic or wood. The preferred metal is aluminum, but stainless steel or cast iron can be used for all of the components part or some of them. The plastics preferred in this device are polypropylene and ethylene, but especially preferred is cross-linked polyethylene.

Contemplated within the scope of this invention is the use of an addition container to hold various grooming materials used by the equestrian such as shampoo, brushes, hoof picks and the like. The table 16 is contemplated to be flat, or have retaining sides as the owner wishes. This table is contemplated to hold larger items such as cinches, bedding bail, boots, blankets, buckets and the like.

What is claimed is:

1. A collapsible, mobile, tack cart, said tack cart comprising:
   a. a cart frame, said cart frame is comprised of a first side frame and an opposing second side frame, said frames having a top, a bottom a near end and a distal end;
   b. said side frames being stabilized by a collapsible support table located near said bottom;
   c. said side frames each having a free-wheeling, rotatable wheel attached to each said side frame, near said bottom and near said distal end;
   d. a rounded frame surmounting said top of said side frames, said rounded frame having a first bottom edge and a second bottom edge;
   e. said rounded frame being hingedly secured to one said side frame at said top of said side frame at said first bottom edge;
   f. said rounded frame being nested on said second side frame by a single rail and stabilizing inserts;
   g. there being lift handles fixedly attached to each said side frame at said back and near said top;
   h. there being a removable support rod attached to said top of said tack cart to support saddle pads;
   i. said removable support rod having a front end hook configuration;
   j. there being at least one hook attached to said rounded frame at said near end.

2. The tack cart as claimed in claim 1 manufactured from metal.

3. The tack cart as claimed in claim 2 wherein the metal is aluminum.

4. The tack cart as claimed in claim 2 wherein the metal is stainless steel.

5. The tack cart as claimed in claim 2 wherein the metal is cast iron.

6. The tack cart as claimed in claim 1 manufactured from wood.

7. The tack cart as claimed in claim 1 manufactured from plastic.

8. The tack cart as claimed in claim 7 wherein the plastic is polypropylene.

9. The tack cart as claimed in claim 7 wherein the plastic is polyethylene.

10. The tack cart as claimed in claim 7 wherein the plastic is cross-linked polyethylene.

11. The tack cart as claimed in claim 1 wherein, in addition, there is a container attached to said cart.

12. The tack cart as claimed in claim 11 wherein the container is a box.

13. The tack cart as claimed in claim 11 wherein the container is a basket.

14. The tack cart as claimed in claim 1 wherein the top of said table is metal mesh.

* * * * *